United States Patent
Smith et al.

(10) Patent No.: US 6,593,912 B1
(45) Date of Patent: Jul. 15, 2003

(54) ELECTRO-MECHANICAL TRANSDUCER FOR SIX DEGREES OF FREEDOM INPUT AND OUTPUT

(75) Inventors: Barton Allen Smith, Campbell, CA (US); Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/532,279

(22) Filed: Mar. 21, 2000

(51) Int. Cl.[7] ................................................ G09G 5/08
(52) U.S. Cl. .................. 345/167; 345/161; 74/471 XY
(58) Field of Search ................................ 345/156–168; 338/128; 200/6 A; 341/176, 20; 315/227 R; 74/471 XY

(56) References Cited

U.S. PATENT DOCUMENTS

| | | | |
|---|---|---|---|
| 4,216,467 A | * 8/1980 | Colston | ............ 341/176 |
| 4,320,392 A |   3/1982 | Giovinazzo et al. | |
| 4,641,123 A | * 2/1987 | Whitehead | ............ 338/128 |
| 4,811,608 A |   3/1989 | Hilton | |
| 4,962,448 A | * 10/1990 | DeMaio et al. | ............ 200/6 A |
| 5,075,600 A | * 12/1991 | El-Hamamsy et al. | .. 315/227 R |
| 5,113,714 A |   5/1992 | Eklund et al. | |
| 5,576,704 A | * 11/1996 | Baker et al. | ............ 200/6 A |
| 5,699,695 A |   12/1997 | Canfield et al. | |
| 5,767,840 A |   6/1998 | Selker | |
| 5,825,308 A | * 10/1998 | Rosenberg | ............ 341/20 |
| 6,329,812 B1 | * 12/2001 | Sundin | ............ 200/6 A |

OTHER PUBLICATIONS

LeFebvre, William; "Automatic IP Address Configuration"; Daemons & Dragons, Performance Computing, Jul. 1999.

* cited by examiner

*Primary Examiner*—Dennis-Doon Chow
(74) *Attorney, Agent, or Firm*—Robert Buckley; Daniel E. Johnson

(57) ABSTRACT

An electro-mechanical transducer for 6 degrees-of-freedom input and output includes a control member coupled to a reference member by pairs of linear transducers. One end of each pair is connected to 3 spaced apart points of the control member, while the other end of each transducer is coupled to 3 spaced apart points of the reference member in a permutation of the first set of connections. The transducer coupling permutation causes each transducer output signal to include components of displacement and rotation such that 6 linear transducers provide a complete definition of the control member orientation in 3-D space. In a specific embodiment each linear transducer includes a linear actuator for inserting force along each connection between the two members. The insertion of force permits the introduction of tactile feel. In another embodiment, restraining means are inserted between the two members such that an application of force exceeding a predetermined threshold must be applied to the control member to change its position or orientation with respect to the reference member. The linear actuators are employed for this purpose. The present implementation has the advantages of simplicity, low cost, ease of manufacture, simple arithmetic transformations, a single type of linear transducer, that is easy to manufacture, and that can accommodate a linear motor for adding tactile feedback.

10 Claims, 2 Drawing Sheets

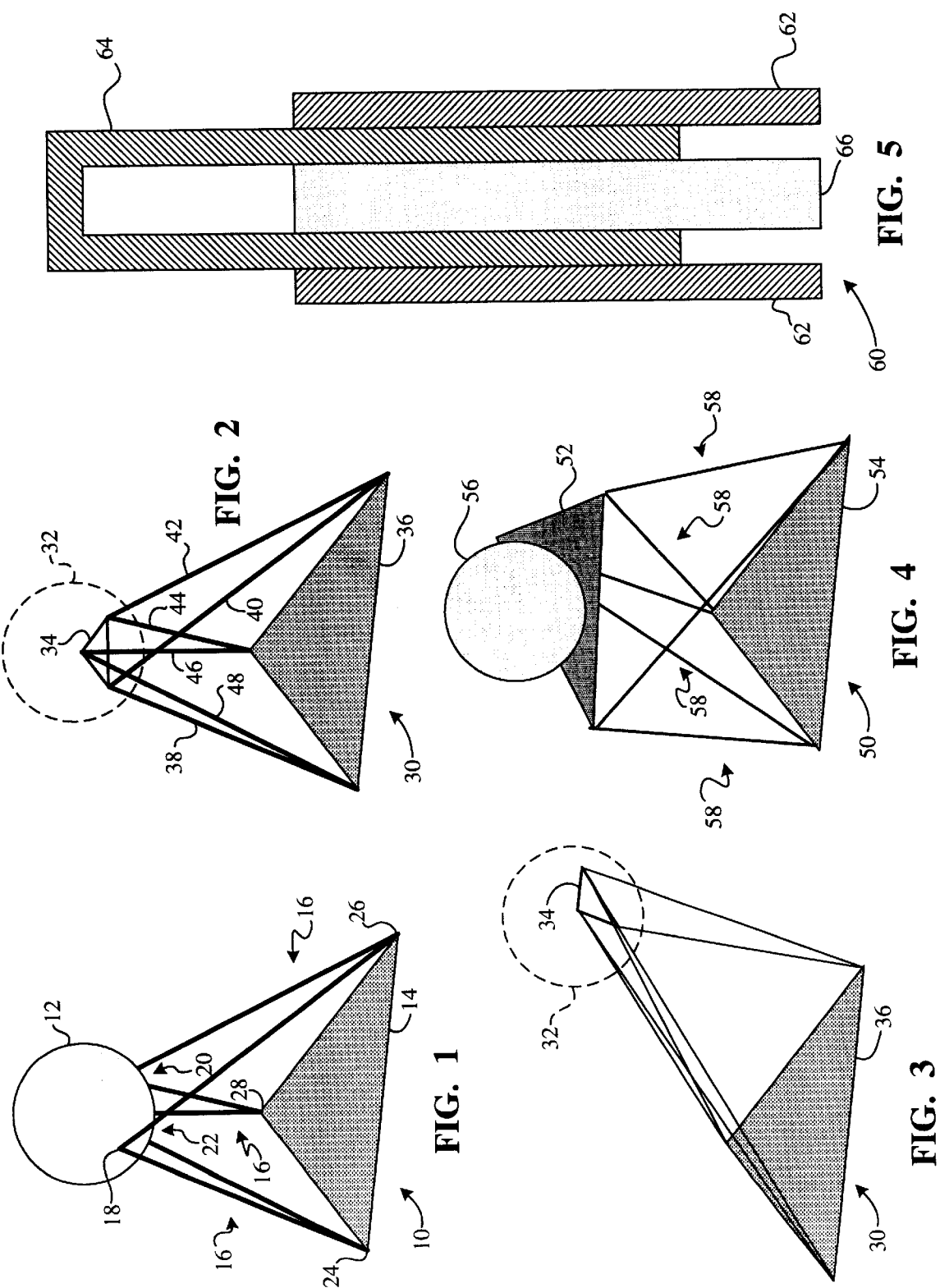

ELECTRO-MECHANICAL TRANSDUCER FOR SIX DEGREES OF FREEDOM INPUT AND OUTPUT

FIELD OF THE INVENTION

The invention relates generally to information processing systems, and more particularly to computer-pointing devices for use with three-dimensional display systems.

BACKGROUND OF THE INVENTION

Computer-pointing devices for three-dimensional display systems are known. See for example U.S. Pat. No. 5,767,840 to Selker, and assigned to the assignee of the present patent application, and U.S. Pat. No. 5,699,695 to Canfield et al. The known devices do not lend themselves to the application of force feedback, Selker, or tend to be overly complex, Canfield et al.

A need exists for a simple, low-cost, easy-to-manufacture electro-mechanical transducer for 6-degrees of freedom input and output.

SUMMARY OF THE INVENTION

The present invention is a simple device that meets this need. In a preferred embodiment, it includes a spherical control member firmly mounted on a triangular platform that is suspended above a fixed reference by 6 linear transducers. The spherical control member includes a compressible pressure sensor that is used as a "click" mouse button.

Each of the 6 linear transducers is a simple capacitive-type device that provides an output signal proportional to the transducer extension ("length"). The transducers are movably attached in pairs to vertices of the triangular platform. The opposite ends of the transducers are movably attached in a permutation to three points of the fixed reference. The 6 linear transducers extend and contract as the spherical control member is moved in 3-dimensional space. The transducer output signals define a 6-degree-of-freedom vector that precisely specifies the position and orientation of the control member in 3-dimensional space.

In another embodiment of the invention, at least some of the transducers include linear force actuators for inserting force between the transducer endpoints. Electrical signals are applied to the actuators that create force in opposition to change in position, velocity, and rotation of the control member in 3-dimensional space. Thus it is possible to provide a user with a tactile feel that he is pushing against a real force. Alternatively, the actuators can be used to move the control member in a gentle, guiding way during a user-training session.

In yet another embodiment, the invention includes means for maintaining the control member in a fixed relation with respect to 3-dimensional space such that the user must overcome threshold inertia to move or re-orient the control member in the 3-dimensional space.

The present implementation has the advantages of simplicity, low cost, ease of manufacture, simple arithmetic transformations, a single kind of transducer, a linear transducer, a transducer that is easily fitted with a linear motor for adding tactile feedback force.

BRIEF DESCRIPTION OF THE DRAWINGS

FIG. 1 is a pictorial diagram illustrating a 6-degree of freedom computer pointing device according to one embodiment of the present invention.

FIG. 2 is another pictorial view of the computer pointing device of FIG. 1, illustrating an imaginary control plane disposed within a control member.

FIG. 3 is a pictorial view of the computer-pointing device of FIG. 2, illustrating a positioning of the control member to another location in 3-dimensional space.

FIG. 4 is a different embodiment of the computer-pointing device of FIG. 1 in which the imaginary control plane is embodied in a real plane-like element.

FIG. 5 is a cut-away plan view that illustrates a specific embodiment of a capacitive linear transducer according to another aspect of the present invention.

DESCRIPTION OF THE PREFERRED EMBODIMENT

Figure 6:
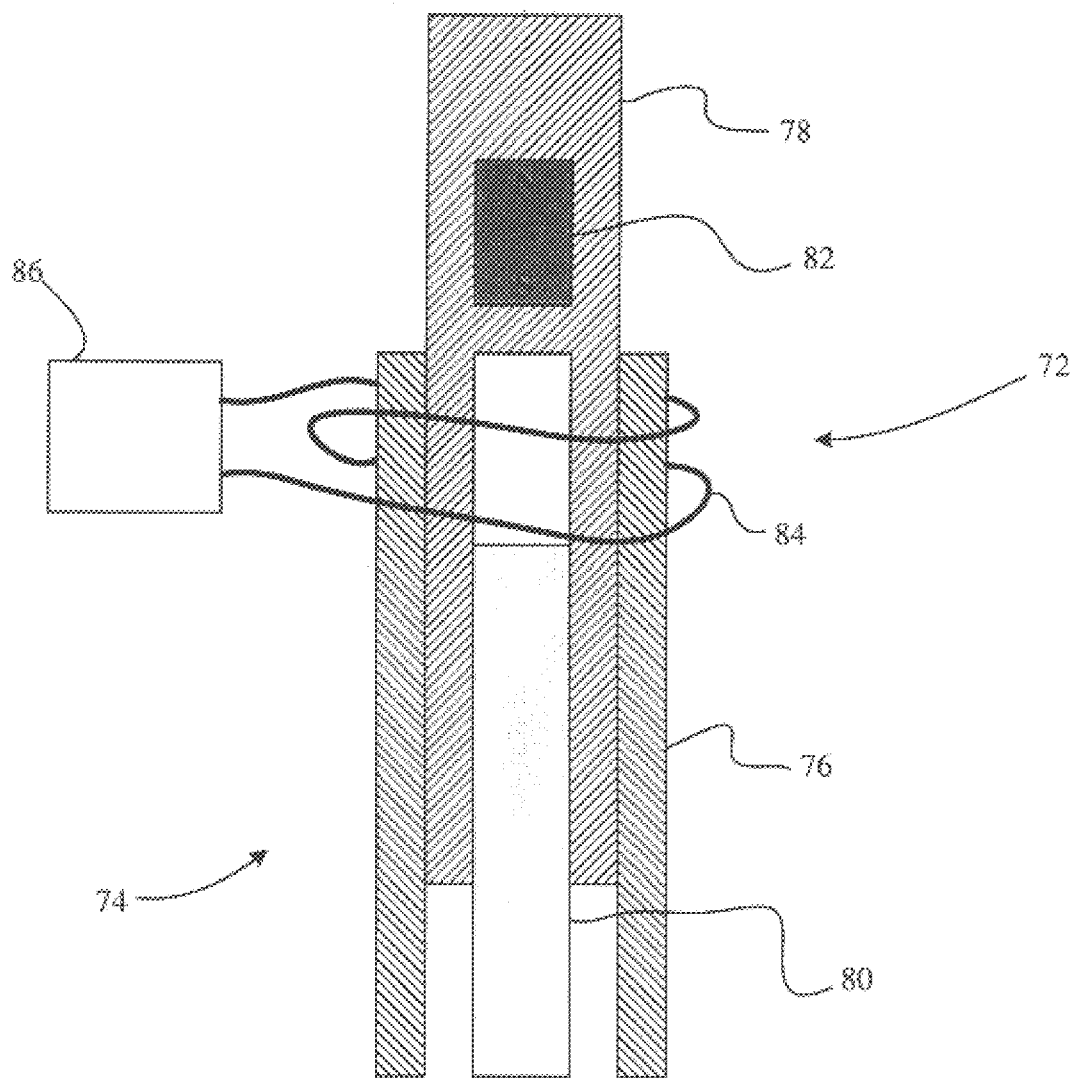
FIG. 6 is a cut-away plan view that illustrates a specific embodiment of a combination linear force actuator and displacement transducer according to another aspect of the present invention.

With reference to FIG. 1 there is shown an electro-mechanical transducer for 6 degrees-of-freedom input and output, designated generally by the reference numeral 10. The transducer 10 includes a control member 12, a reference member 14, and 6 linear transducers, indicated generally by the numeral 16.

In a specific embodiment, the control member 12 is ball shaped for ease of handling and is made of a compressible material concealing an electrical switch (not shown) for a "click" mouse-type action. Three pair of linear transducers 16 connect three points on the ball-like control member 12 with three points of the reference member 14. In an alternative embodiment (not shown), a variable pressure sensor is concealed inside the compressible material, providing an output signal proportional to pressure. In a specific embodiment, the proportional output signal is applied to another degree of freedom, for example the size of the object.

The points of the control member (not all visible) are designated 18, 20, 22, respectively. The points of the reference member are designated 24, 26, and 28. The linear transducers 16 are connected to each point in pairs and the opposite ends of the transducers are connected in a permutation of the first pair connections. In a specific embodiment the 6 linear transducers are individually connected between each of the following pairs of points: 18–24, 18–26, 20–26, 20–28, 22–28, 22–24.

The three points 18, 20, 22 on the control member 12 define a 3-D coordinate system that moves and rotates as the ball-like control member 12 is moved and rotated. The three points 24, 26, 28 on the reference member 14 define a 3-D coordinate system that remains fixed with respect to the movable control member 12.

Each of the linear transducers 16 provides an output signal that is proportional to the "extension" of the transducer, that is, the signal has one level when the transducer ends are pushed toward one another, a second level when the transducer ends are pulled away from one another, and intermediate levels for "extensions" in between these extremes.

The transducer coupling between the control member 12 and the reference member 14 is "permuted." That means that the paired connections at the control-member end of the transducers differ from the paired connections at the reference-member end. Such a "permutation" is demonstrated in the list of connections provided above. Thus the transducers couple different sets of points in the two coordinate systems. As a result of this "permutation," the outputs of the linear transducers provide information defining position and orientation of the control member 12 with respect to the reference member 14. The order of permutation affects only which points in the two coordinate systems are connected. Any change in the permutation, that is, in the order of connection of the transducers, is accommodated by a change in a computer program or other procedure that interprets the transducer output signals.

FIG. 2 is another pictorial view of the computer pointing device of FIG. 1, illustrating an imaginary control plane disposed within a control member. The pointing device is designated generally by the numeral 30, and includes a movable control member 32 (dashed line), an imaginary control plane 34, a fixed base member 36, and three pair of linear transducers, 38–48, respectively.

The imaginary control plane 34 is located within the ball-shaped control member 32. The imaginary control plane 34 represents a triangle formed by connecting three points on the surface of the ball-shaped control member 32 that are connected to one end of paired linear transducers. Applying that definition for the imaginary control plane, the plane moves with the ball (control member 32). As the ball 32 is lowered closer to the base member 36, the imaginary control plane is lowered also. As the ball 32 is pushed to one side, the imaginary control plane moves to one side also. The ball 32 and the imaginary control plane 34 are locked together and move and rotate as a single unit.

As the ball 32 is moved and rotated, the linear transducers 38–48 extend or retract to accommodate the motion and rotation. As they do so, the linear transducer output signals change value in proportion to each transducer's extension, as that term was defined above. Thus, at any moment in time, the position and orientation of the imaginary plane 34 with respect to the fixed base member 36 is defined by the values of the output signals of the 6 linear transducers. A computer program or other process (not shown) uses the values of the 6 linear transducer output signals to compute a 3-D location and orientation of the ball 32 according to known trigonometric relationships. The computer program or other process that performs such computation is not part of the present invention, and is known to those skilled in the art of data acquisition and computer programming.

FIG. 3 is a pictorial view of the computer-pointing device of FIG. 2, illustrating a repositioning of the control member 32 to another location in 3-dimensional space. The computer-pointing device 30 is the same pointing device shown in FIG. 2 except that the ball 32 is moved to the right and is raised somewhat higher above the fixed base member 36. Closer examination reveals that the ball 32 has also been rotated approximately 90 degrees in a counter-clockwise direction about a nearly vertical axis, when viewed from above the ball 32. The values of the 6 linear transducer output signals will be somewhat greater because each of the transducers appears to have been extended beyond where they were in FIG. 2. In actual use, a computer program, or other process to define a location and orientation in 3-D space relative to the fixed base member 36, interprets differences in the transducer output values from their previous values (FIG. 2) to establish a new location and orientation in 3-D space.

Movement and rotation of the control member 32 is limited only by the extensibility of the linear transducers and mechanical interference between the transducers. These limits establish a range of possible displacement and rotation within a 3-D space.

FIG. 4 is a slightly different embodiment of the computer-pointing device of FIG. 1 in which the imaginary control plane is replaced by a real plane-like element. The pointing device is designated generally by the numeral 50 and includes a control member 52, a fixed base member 54, a ball-shaped control handle 56, and 6 linear transducers connecting three points of the control member 52 with a permuted three points of the fixed base member 54. The 6 linear transducers are designated generally by the reference numeral 58. In a specific embodiment, the ball-shaped control handle 56 is made of a compressible material concealing a pressure sensor (not illustrated) such as an electrical switch for "clicking" in a mouse-like manner.

FIG. 5 is a cut-away plan view that illustrates a specific embodiment of a linear transducer according to another aspect of the present invention. The transducer is designated generally by the numeral 60 and includes a conductive tube 62, a slidable dielectric insert 64, and an electrically insulated inner rod 66. The dielectric insert 64 is slidable into and out of one end of the conductive tube 62. In a specific embodiment, the slidable dielectric insert 64 is made of Teflon®, but other dielectric materials are also useable.

The conductive tube 62 is connected to a common ground circuit. As the dielectric insert 64 is inserted into the conductive tube 62, the capacitance between the inner rod 66 and the conductive tube 62 increases in proportion to the amount of insertion. An electrical circuit (not shown) is connected to measure the capacitance and produces a transducer output signal that is proportional to the extension (as defined above) of the linear transducer 60. By grounding the outer tube 62, the inner rod 66 is shielded from electrical noise in the environment. The use of a moving dielectric insert 64 allows the ball-shaped control handle 56 to be electrically isolated from the capacitance-measuring circuit (not shown), thus eliminating another source of electrical interference.

Finally, FIG. 6 is a pictorial view of a combination linear force actuator 72 and displacement transducer 74. The displacement transducer 74 includes a conductive tube 76, a slidable dielectric insert 78, and an electrically insulated inner rod 80. The capacitance between the inner rod 80 and the conductive tube 76 increases in proportion to the amount of insertion. The linear force actuator 72 includes a permanent magnet 82 located inside the dielectric insert 78 and a magnetic coil 84 wound around the conductive tube 76, creating a solenoid. In a preferred embodiment the conductive tube 76 is constructed from nickel coated plastic. The magnetic coil 84 is connected to a current source 86 that is controlled by a computer (not shown). As the current in the magnetic coil 84 increases, the force on the permanent magnet 82 increases. A permanent magnet 82 is used to allow force to be applied in both directions. The direction of the force is determined by the direction of the current in the magnetic coil 84. In another embodiment (not shown) the permanent magnet 82 is replaced with ferrous metal, and a spring is used to provide a restoring force.

While the invention has been described in relation to the embodiments shown in the accompanying figures, other embodiments, alternatives and modifications will be apparent to those skilled in the art. It is intended that the Specification be exemplary only, and that the true scope and spirit of the invention be indicated by the following claims.

What is claimed is:

1. A device, comprising:

a control member movable in three-dimensional space and defining a control member reference system;

a base member connected to the control member and defining a base-member reference system;

pairs of linear transducers coupling the control member with the base member such that the control member is free to move in 6 degrees of freedom with respect to the base member;

each linear transducer providing an output determined by its extension;

the transducers connecting the control member and the base member by coupling different axes of their respective reference systems such that the output of each linear transducer is responsive to displacement and rotation of one reference system with respect to the other;

wherein movement of the control member with respect to the base member provides information on translation and rotation of the control member reference system with respect to the base member reference system that is useful as a 3-D pointing device, wherein the control member is ball-shaped, compressible and provides a mouse click.

2. The device as set forth in claim 1, wherein the transducers include actuators for applying force to the control member with respect to the base member.

3. The device as set forth in claim 2, wherein the actuators provide maintaining forces and provide threshold forces to the control member that must be exceeded to change the position or orientation of the control member with respect to the base member.

4. The device as set forth in claim 1, wherein the ball-shaped control member provides an output signal determined by its compression.

5. The device of claim 1, wherein at least one transducer includes a grounded conductive outer tube surrounding an insulated inner rod, the outer tube being open at one end for receiving a dielectric insert slidably insertable into the outer tube and fitting into a space between the outer tube and the inner rod, the device further comprising an electrical circuit connected between the outer tube and the inner rod for measuring the capacitance between the outer tube and the inner rod, and providing an output signal responsive to the extension of said at least one transducer.

6. An electro-mechanical device for 6 degrees-of-freedom input and output, comprising:

a control member movable with respect to a base member;

6 transducers coupling the control and base members, the transducers providing respective output signals corresponding to the extension of the transducers, the output signals defining the position and the orientation of the control member;

actuators connected to the control member, the actuators being controllable by a computer that controls force applied to the control member;

wherein at least one transducer includes a grounded conductive outer tube surrounding an insulated inner rod, the outer tube being open at one end for receiving a dielectric insert slidably insertable into the outer tube and fitting into a space between the outer tube and the inner rod, the device further comprising an electrical circuit connected between the outer tube and the inner rod for measuring the capacitance between the outer tube and the inner rod, and providing an output signal responsive to the extension of said at least one transducer;

a permanent magnet secured to a portion of the dielectric insert; and a coil surrounding said portion.

7. A device, comprising:

a ball-shaped control member movable with respect to a base member;

6 transducers coupling the control and base members, the transducers providing respective output signals corresponding to the extension of the transducers, the output signals defining the position and the orientation of the control member; and actuators connected to the control member, the actuators being controllable by a computer that controls force applied to the control member, wherein the ball-shaped control member is compressible and provides a mouse click.

8. The device as set forth in claim 7, wherein the ball-shaped control member provides an output signal corresponding to its compression.

9. The device of claim 7, wherein at least one transducer includes a grounded conductive outer tube surrounding an insulated inner rod, the outer tube being open at one end for receiving a dielectric insert slidably insertable into the outer tube and fitting into a space between the outer tube and the inner rod, the device further comprising an electrical circuit connected between the outer tube and the inner rod for measuring the capacitance between the outer tube and the inner rod, and providing an output signal responsive to the extension of said at least one transducer.

10. A device, comprising:

a control member movable in three-dimensional space and defining a control member reference system;

a base member connected to the control member and defining a base-member reference system; and transducers coupling the control member with the base member such that the control member is free to move in 6 degrees of freedom with respect to the base member;

the transducers providing respective outputs determined by their respective extensions and providing a force on the control member to give a user the sense of tactile feel;

the transducers connecting the control member and the base member, wherein the force is controllable by a computer;

wherein movement of the control member with respect to the base member provides information on translation and rotation of the control member reference system with respect to the base member reference system; and wherein the control member is a ball-shaped, compressible member that provides a mouse click.

* * * * *